United States Patent [19]
Ito

[11] Patent Number: 4,510,364
[45] Date of Patent: Apr. 9, 1985

[54] ELECTRIC DISCHARGE MACHINING APPARATUS

[75] Inventor: Tetsuro Ito, Aichi, Japan

[73] Assignee: Mitsubishi Denki Kabushiki Kaisha, Tokyo, Japan

[21] Appl. No.: 302,480

[22] PCT Filed: Jan. 21, 1981

[86] PCT No.: PCT/JP81/00014

§ 371 Date: Sep. 10, 1981

§ 102(e) Date: Sep. 10, 1981

[87] PCT Pub. No.: WO 81/02127

PCT Pub. Date: Aug. 6, 1981

[30] Foreign Application Priority Data

| Jan. 22, 1980 [JP] | Japan | 55-6109 |
| Apr. 23, 1980 [JP] | Japan | 55-53868 |
| Apr. 23, 1980 [JP] | Japan | 55-53869 |
| Apr. 23, 1980 [JP] | Japan | 55-53870 |
| Apr. 23, 1980 [JP] | Japan | 55-53872 |
| Apr. 23, 1980 [JP] | Japan | 55-53873 |

[51] Int. Cl.³ .................................... B23P 1/08
[52] U.S. Cl. .......................... 219/69 G; 219/69 S
[58] Field of Search .......... 219/69 R, 69 G, 69 C, 219/69 S, 69 M

[56] References Cited

U.S. PATENT DOCUMENTS

| 4,049,942 | 9/1977 | Balleys et al. | 219/69 G |
| 4,135,070 | 1/1979 | Pfau et al. | 219/696 |
| 4,249,059 | 2/1981 | Bell, Jr. et al. | 219/69 G |
| 4,345,131 | 8/1982 | Semon et al. | 219/124.02 |
| 4,365,300 | 12/1982 | Johanson et al. | 219/69 G |

FOREIGN PATENT DOCUMENTS

2011653 7/1979 United Kingdom ............ 219/69 G

Primary Examiner—M. H. Paschall
Attorney, Agent, or Firm—Sughrue, Mion, Zinn, Macpeak, and Seas

[57] ABSTRACT

In an electric discharge machining apparatus for machining a workpiece by confronting an electrode and the workpiece through an insulating machining solution, feeding the electrode to the workpiece and causing electric discharge between the confronting electrode and workpiece the difference between the most advanced position of the electrode relative to the workpiece and the present position of the electrode is detected and a signal is outputted by identifying the interelectrode state in accordance with the detected result. Thus, the propriety of the interelectrode machining gap state in the electric discharge machining are accurately observed, and the workpiece is machined under preferable machining conditions.

81 Claims, 14 Drawing Figures

1

ELECTRIC DISCHARGE MACHINING APPARATUS

DESCRIPTION

TECHNICAL FIELD

This invention relates to electric discharge machining apparatuses, and more particularly to an electric discharge machining apparatus for machining a workpiece by producing electric discharge generated between confronting electrodes through an insulating machining solution.

BACKGROUND OF THE INVENTION

A conventional technique of the type described above is shown in FIG. 1.

In FIG. 1, an electrode (1) for machining a workpiece (3) with a configuration confronts the workpiece (3) disposed within a machining tank (2) through a machining gap (G). The tank (2), and consequently the gap (G), are filled with an insulating machining solution (4). A machining power source (5) includes a DC power source (51), a switching element (52) for switching the machining power source (5), a current limiting resistor (53) and an oscillator (54) for controlling the switching operation of the switching element, and supplies a switching current (I) between the electrode (1) and the workpiece (3). The switching current (I) is represented by the expression $I=(E-V_g)/R$, and the interelectrode voltage ($V_g$) becomes 20 to 30 V during arc discharge, 0 V at short-circuiting time and E during no discharge. The interelectrode voltage $V_g$ becomes 0 V when the switching element (52) is in its off state. If the interelectrode voltage $V_g$ is detected and is averaged by a smoothing circuit (6), the machining gap can be controlled by the averaged value of the interelectrode voltage $V_g$. More specifically, when the machining gap is wide, a discharge will hardly occur so that the average voltage (VS) becomes high. When the gap is narrow, a short-circuit will occur between the workpiece and the electrode to be readily discharged, causing a reduction in the average voltage. Accordingly, when the voltage (VS) is compared with a reference voltage (Vr) and the difference voltage therebetween is inputted to an interelectrode servo circuit in which the difference voltage is amplified by an amplifier (7) and amplified difference voltage is inputted to a hydraulic servo coil (8), a hydraulic servo mechanism which includes a hydraulic pressure generating pump (9), a hydraulic cylinder (10) and an electrode supporting rod (11), and so forth, is so controlled that the interelectrode gap (G) may substantially become constant. The interelectrode servo circuit and the hydraulic servo mechanism form electrode feeding means.

The most general measure for determining the propriety of the machining conditions, or interelectrode state by the conventional electric discharge machining apparatus is to observe the average interelectrode voltage $V_g$. If the average interelectrode voltage $V_g$ is low, the interelectrode impedance is low. This is considered to cause a short-circuit between the electrode and the workpiece, a continuous arc discharge, machining powder or chips between the electrodes, and sludge accumulated therebetween, and so forth. Since carbon is generated due to the thermal decomposition of the machining solution if the most dangerous abnormal electric arc discharge has once occurred in an electric arc discharge machining, an electric discharge occurs between the carbon and the workpiece. This increases the interelectrode impedance, with the result that the detection of the deterioration in the interelectrode state due to the average voltage becomes impossible.

Another conventional method of detecting abnormal electric arc discharge between electrodes includes the steps of observing the operation of the electrodes with a mechanical gauge such as a dial gauge, and determining the electrode vibrating state and the stability of machining the workpiece at the machining time. This method requires observation in the vicinity of the electric discharge machining apparatus. It is accordingly impossible to detect the deterioration of the interelectrode state during electrical discharge from a location apart from the electric discharge machining apparatus during an operatorless operation.

It is evident from the foregoing description that the state of the interelectrode can be readily determined if the output detected by the aforementioned dial gauge is converted into an electric signal, snce the electric signal like the above average voltage can be observed at a place considerably isolated from the electric discharge machining apparatus. However, in the case where a digital numerical signal corresponding to the position of the electrode is observed, the signal will include a variety of superimposed numerical values, but does not contain data which can be separately identified as corresponding to the vibrating state. It is impossible and useless to read infinitesimal variations in an analog signal having a resolution of several microns, due to the fact that, if a total stroke of several hundred millimeters is to be observed, with 1 micron, converted into 1 mV, the total stroke corresponds to several hundred V, and further microminiature variations are to be read from the observed voltage.

The advantage of the dial gauge is such that, in the case of a dial gauge having 1 mm per one revolution, the displacement of 10 μm can be observed as the variation of 3.6° and the total stroke is covered by rotating the gauge many times. It was, however, heretofore impossible to convert the function into an electric measure so as to observe it at a place apart from the apparatus and to suitably identify the occurrence of abnormality between the electrodes.

SUMMARY OF THE INVENTION

According to the invention, there is provided an electric discharge machining apparatus for machining a workpiece by confronting an electrode and the workpiece through an insulating machining solution and generating an electrical discharge therebetween, which apparatus includes electrode position detecting means for detecting the difference between the most advanced position of the electrode fed to the workpiece and the present position of the electrode, and interelectrode state identifying means for determining a deteriorated interelectrode state if the difference becomes high, thereby outputting a signal.

An object of this invention is to provide electric discharge machining apparatuses with a unit for detecting the length of the interelectrode machining gap and for identifying the interelectrode state in which electric machining conditions adapted for the interelectrode state on the basis of the identification of said unit, that is, an electrical discharge peak current value, consecutive electric discharging time, down time, applied voltage and so forth can be automatically set, thereby controlling an optimum electric discharge energy.

Another object of the invention is to provide electric discharge machining apparatuses with a unit for detecting the length of the interelectrode machining gap, for identifying the interelectrode state and recovering a desired interelectrode state by forcibly expanding the gap between the electrode and the workpiece with the ratio of the expanded amount to the machining time being automatically controlled in response to the detected output from the unit.

A further object of the invention is to provide electric discharge machining apparatuses in which actual length of interelectrode machining gap is detected, the speed or servo gain of an interelectrode servo is varied on the basis of the detected output, thereby conducting interelectrode servo at high speed when the interelectrode gap is wide while controlling precisely the interelectrode servo at a low predetermined speed when the interelectrode gap is narrow, so as to enable the optimum interelectrode gap servo gain.

A still further object of the invention is to provide electric discharge machining apparatuses in which a value corresponding to the actual interelectrode gap between the electrodes is produced as an analog electric signal, the interelectrode state is further detected on the basis of the signal, and these signals are accurately transmitted to a place isolated from the electrodes.

DETAILED DESCRIPTION OF THE PREFERRED EMBODIMENTS

Figure 1:
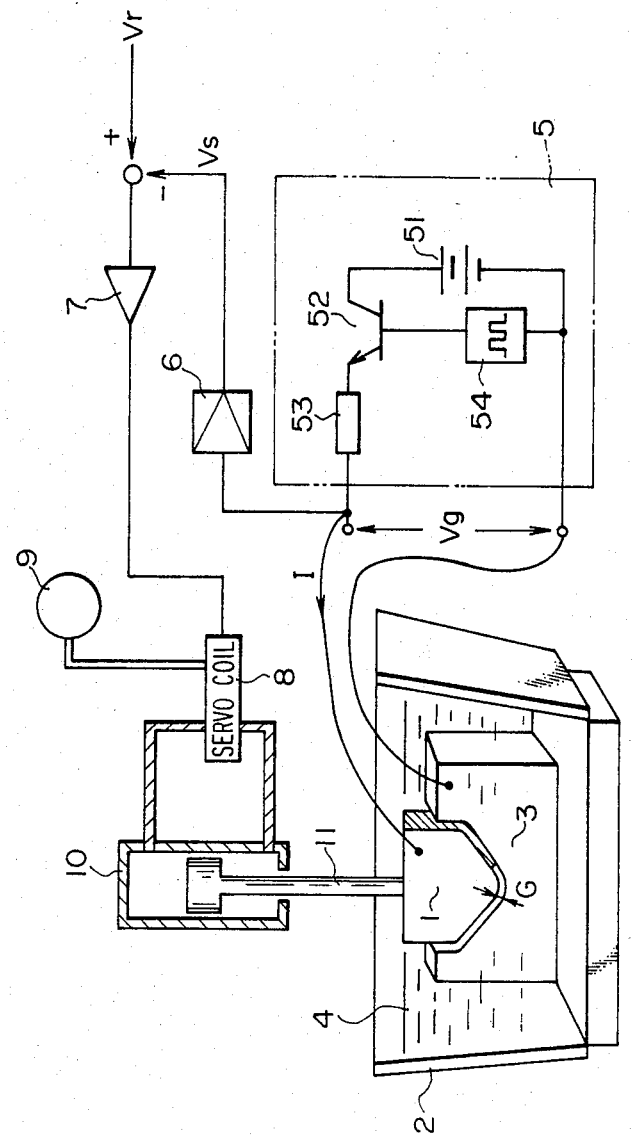
FIG. 1 is a schematic structural diagram of a conventional apparatus.
Figure 2:
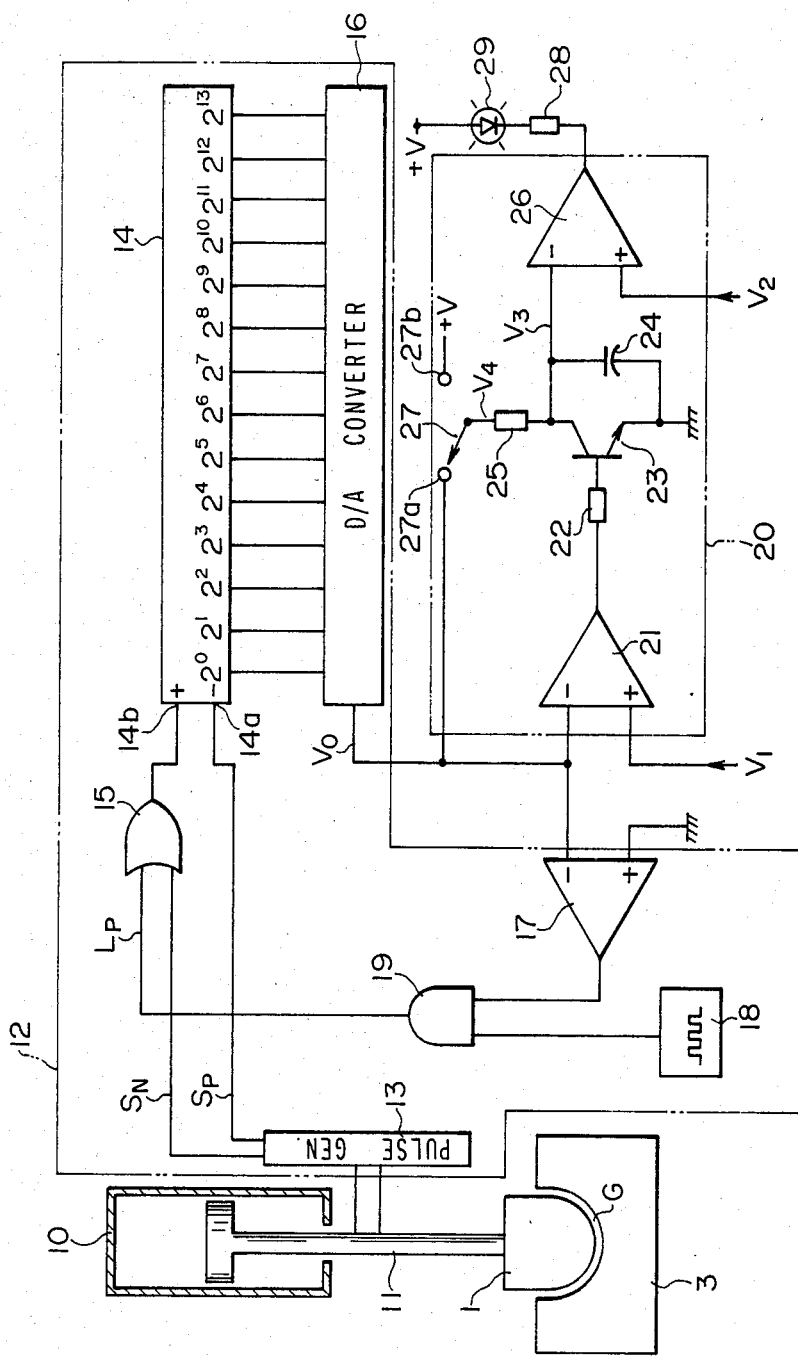
FIG. 2 is a diagram showing one example of an electric discharge machining apparatus according to the invention having the arrangement of the conventional apparatus to which is added the electrode position detecting means and interelectrode state identifying means.

FIG. 2 is a schematic diagram showing the arrangement of one preferred example of an electric discharge machining apparatus according to the present invention, wherein like reference numerals designate the equivalent or similar parts and components shown in FIG. 1. In FIG. 2, a digital scale (13) mounted at an electrode supporting rod (11) produces a positive-going pulse $S_P$ when the electrode (1) moves downwardly in FIG. 2 and produces a negative-going pulse $S_N$ when the electrode (1) moves upwardly in FIG. 2. The digital scale, or pulse generator, (13) thus produces a pulse having a pulse width of less than 10 μm per one pulse so as to accurately detect the length of the interelectrode gap. This example will be described with reference to the pulse from the digital scale having a pulse width of 5 μm/pulse.

The positive-going pulse $S_P$ from the digital scale is applied directly to the negative terminal (14a) of a reversible counter (14), and the negative-going pulse $S_N$ from the digital scale (13) is applied through an OR gate (15) to the positive terminal (14b) of the counter (14). The reversible counter (14) includes, for example, 13 bits and can thus store the amount of upward movement of the electrode corresponding to $5\ \mu m \times (2^{14}-1)$, i.e. 82 mm. The outputs from the respective bits from $2^0$ through $2^{13}$ of the counter (14) are in turn connected to the inputs of a digital-to-analog converter (16), which sequentially produces an output $V_0$. The output $V_0$ from the converter (16) is sequentially applied to the negative input terminal of a comparator (17). The positive input terminal of the comparator (17) is grounded. The comparator (17) will thus compare the output $V_0$ from the converter (16) with the 0 V at the grounded positive input terminal. Accordingly, when the output $V_0$ from the converter (16) is 0 V, that is, when the content of the counter is "0", the comparator (17) will produce an output, which is in turn applied to one input of an AND gate (19). A pulse output from a pulse oscillator (18) is, on the other hand, applied to the other input of the AND gate (19). When the output from the comparator (17) is applied to the AND gate (19) as described above, the AND gate (19) will apply an addition pulse $L_P$ through an OR gate (15) to the positive terminal (14b) of the reversible counter (14).

Assuming, the counter begins at a zero value, the counter will be incremented for electrode movement away from the workpiece and will be decremented for advancing movement of the electrode toward the workpiece. Any net advancing movement will result in a negative counter value, and the output of the comparator (17) will then enable the AND gate (19) to pass the oscillator pulses through the gate (15) to the positive counter input. This will raise the counter value to zero at which point the comparator output will disable the AND gate (19). Thus, the counter (14) will always be "zeroed" at the most advanced position of the electrode, and the content of the counter (14) will therefore always represent the difference between the most advanced electrode position and the present electrode position.

Therefore, since the output from the digital-to-analog converter (16) is a voltage proportional to the difference therebetween as described above, when the output $V_0$ from the converter (16) is detected and processed, the propriety of the actual interelectrode gap state can be observed or examined. That is, when the output $V_0$ from the converter (16) is high, the electrode is retracted from its most advanced position. Accordingly, this can signify difficulties, e.g. sludge accumulated between the electrodes due to the retention of machining chips, machining solution (4) being thermally decomposed due to an abnormal arc to thereby cause the occurrence of carbon, or the electrodes being partly broken to cause the broken pieces being located in the gap (G) between the electrodes.

If such difficulties occur for a short time, the interelectrode impedance varies constantly, and accordingly even if there occurs the aforementioned difference for short time, it may not always be decided that the interelectrode gap state is deteriorated. It is necessary to determined the propriety of the interelectrode gap state by detecting the fact that the existence of the output $V_0$ from the analog-to-digital converter (16) above a predetermined level has continued for a predetermined duration.

The output $V_0$ from the digital-to-analog converter (16) is also applied to the negative input terminal of a voltage comparator (21) in FIG. 2, and a predetermined voltage $V_1$ is, on the other hand, applied to the positive input terminal of the voltage comparator (21). Thus, the voltage comparator (21) compares the output $V_0$ from the digital-to-analog converter (16) with the predetermined voltage level $V_1$, thereby determining whether the output $V_0$ is higher or lower than the predetermined voltage $V_1$. If $V_0 > V_1$, the comparator (21) will produce a negative voltage output, which is in turn applied through a base resistor (22) to the base of a switching transistor (23), thereby cutting off the transistor (23). Thus, a time measuring capacitor (24), connected at one end to the collector of the transistor (23) and at the other to the ground together with the emitter of the transistor (23), is charged through a resistor (25) connected at one end to the collector of the transistor (23) and at the other to a predetermined voltage $V_4$. The voltage $V_3$ across the capacitor (24) will be as expressed by the following expression:

$$V_3 = V_4 \left\{ 1 - \exp\left( -\frac{t}{r_2 c} \right) \right\}$$

where $r_2$ represents the resistance value of the resistor (25), c represents the capacitance of the capacitor (24), and t represents time.

The voltage $V_3$ across the capacitor (24) is in turn applied to the negative input terminal of a voltage comparator (26), and a reference voltage $V_2$ is, on the other hand, applied to the positive input terminal of the comparator (26). Thus, the comparator (26) compares the voltage $V_3$ from the capacitor (24) with the reference voltage $V_2$. Since the output from the voltage comparator (26) does not become negative during a period of $V_3 < V_2$, the output from the comparator (26) applied through a resistor (28) to a light emitting diode (29) does not allow the diode (29) to emit a light. If the state of $V_0 > V_1$ continues for a predetermined time, the capacitor (24) connected to the collector of the transistor (23) is continuously charged as described above, and accordingly the voltage $V_3$ across the capacitor (24) is gradually raised to eventually become $V_3 > V_2$. If $V_3 > V_2$, the output from the comparator (26) will become negative, which is applied through the resistor (28) to the light emitting diode (29). Thus, the diode (29) will emit a light, thereby indicating the occurrence of an abnormal interelectrode gap state.

The other end of the resistor (25) at the voltage $V_4$ as described above is connected to the common terminal of a switch (27), which is provided to switch the connection of the common terminal to either a contact (27a) for determining the interelectrode gap state in accordance with the function of the product of the magnitude of the output $V_0$ from the digital-to-analog converter (16) and the time, or a contact (27b) for determining the interelectrode gap state in accordance with only the function of the time. That is, the contact (27a) of the switch (27) is connected to the output $V_0$ of the converter (16), and when the switch (27) is switched to the contact (27a), the voltage $V_0$ from the digital-to-analog converter (16) is in turn applied through the resistor (25) to the capacitor (24). Thus, the occurrence of the abnormal interelectrode gap state can be rapidly detected in accordance with the function of the product of the output $V_0$ from the converter (16) and the time as indicated in FIG. 2, since the charging current of the capacitor (24) is increased with the result that the voltage $V_3$ across the capacitor (24) will immediately reach the reference voltage $V_2$ if the output $V_0$ from the converter (16) is raised. In this manner, abnormal interelectrode gap states can be detected which would otherwise be difficult to detect merely by the time method, for example, occurrence of instantaneous cracks due to an arc like the machining of superhard alloy, occurrence of defects of tungsten and so forth, which cases can be quickly detected. The contact (27b) of the switch (27) is connected to a voltage $+V$ of the power source for applying a collector voltage through the resistor (25) to the collector of the transistor (23). When the switch (27) is made connection to the contact (27b), merely the time of the abnormal interelectrode gap state can be detected as described above.

It is apparent from the foregoing description with reference to the arrangement in FIG. 2 that by observing the output $V_0$ from the digital-to-analog converter (16) directly with a voltmeter, the difference between the most advanced position of the electrode (1) relative to the workpiece (3) and the present position of the electrode (1) can be observed so that the voltmeter is used as an interelectrode gap state monitor.

In the above-described example, a primary delay circuit with the capacitor and the resistor (25) is employed for the measurement of the time during which the interelectrode gap state is deteriorated. However, instead of the primary delay circuit, an accurate integrating circuit employing an operational amplifier may be readily provided without any difficulty so as to accurately measure the time.

Figure 3:
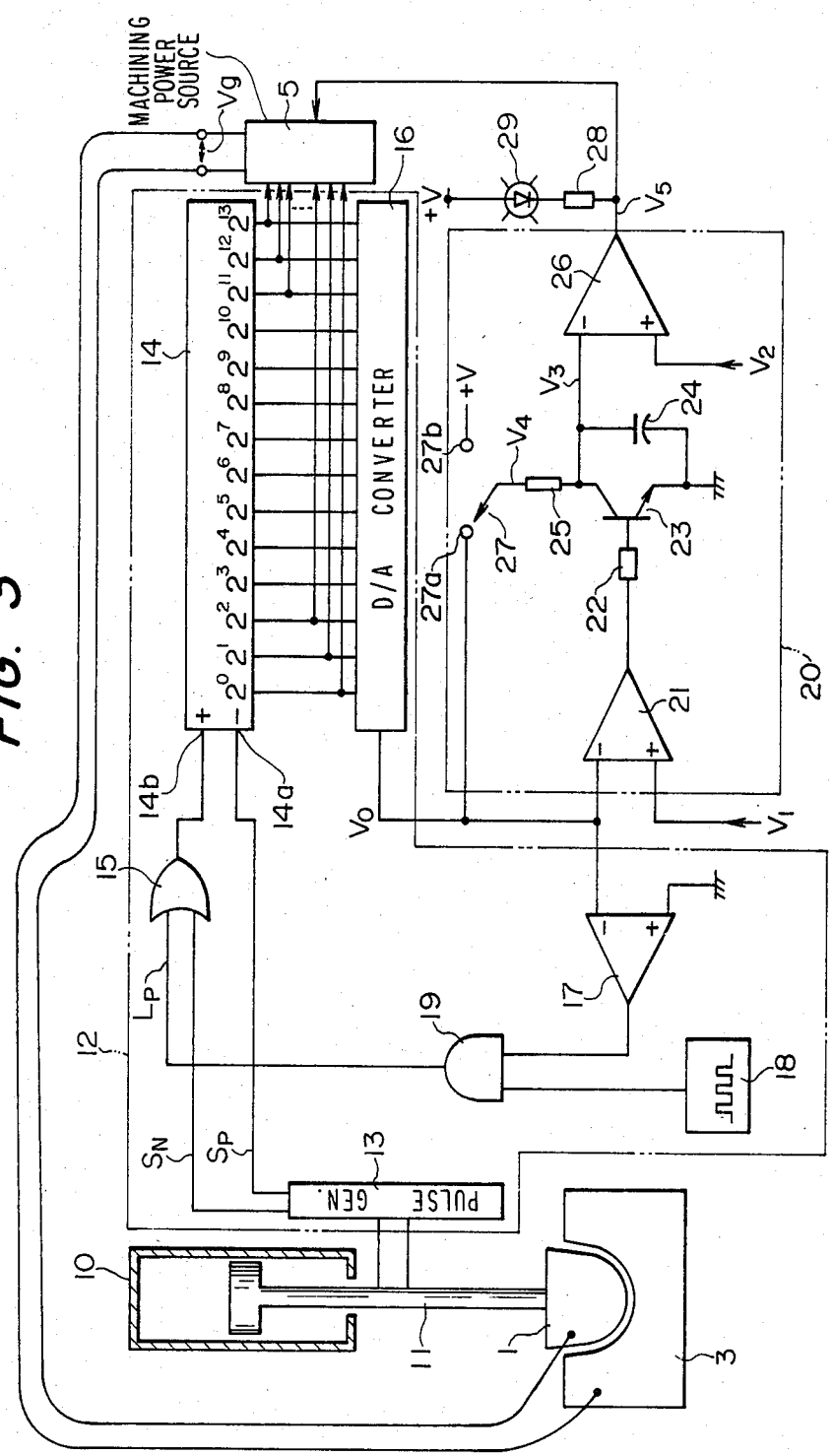
FIG. 3 is a diagram showing another example of the apparatus of the invention.

FIG. 3 shows another preferred example in an arrangement of an electric discharge machining apparatus of the invention capable of switching electrical machining conditions such as machining condition, power source condition and so forth. In FIG. 3, like reference numerals designate the equivalent or corresponding parts and components shown in FIG. 2 and the description thereof will be omitted for the convenience of explanation.

In the arrangement shown in FIG. 3, the voltage output $V_5$ from interelectrode abnormality detecting means is applied to the machining power source (5) together with the binary digital values of the outputs $2^0$ through $2^{13}$ from the counter (14) for detecting the difference between the most advanced position of the electrode and the present position of the electrode. The machining power source (5) is controlled for switching the electric machining conditions thereof in accordance with these output signals from the interelectrode abnormality detecting means and the counter (14).

Figure 4:
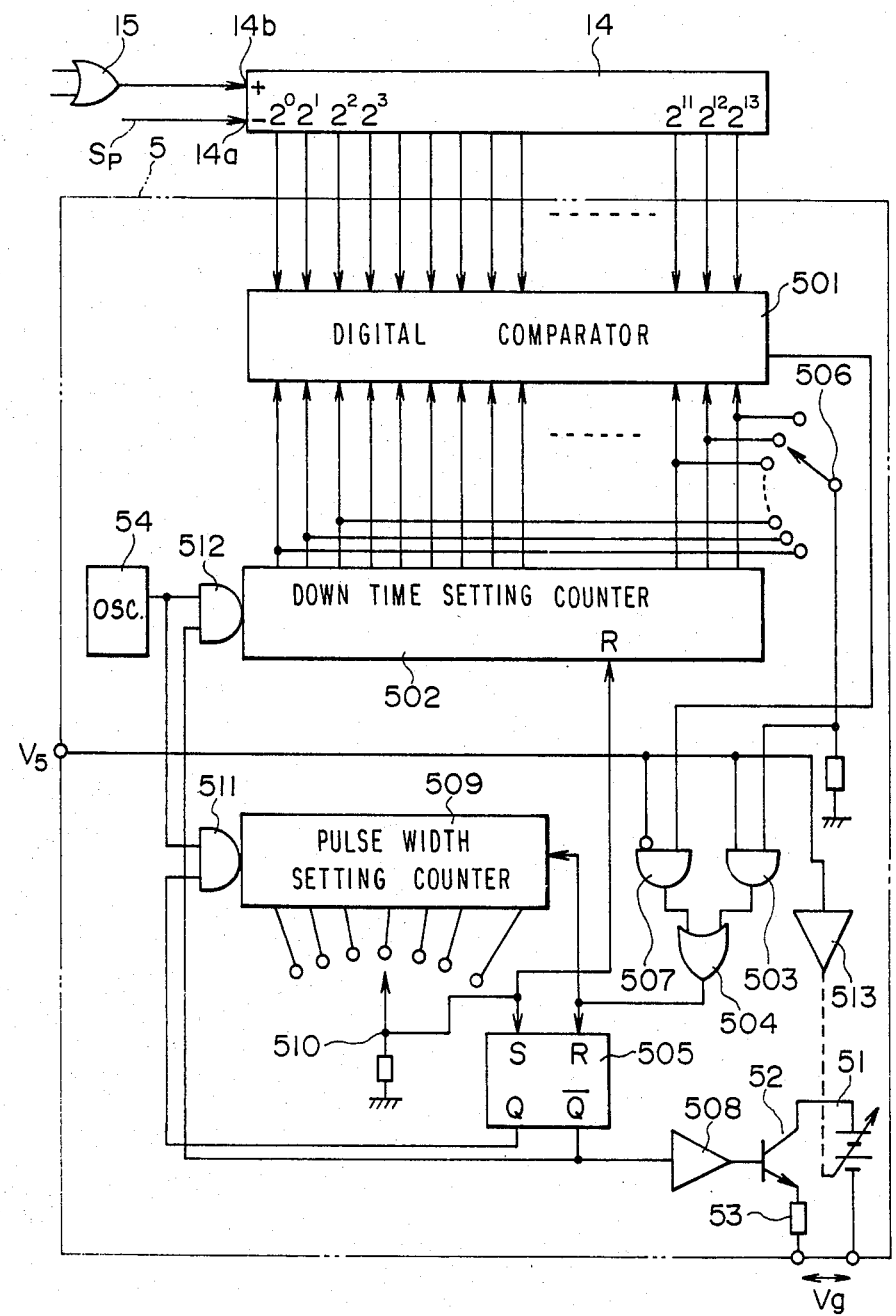
FIG. 4 is a diagram showing a further example of the apparatus of the invention.

FIG. 4 is a detailed diagram of the machining power source (5) in the form of preferred example in which the discharge down time and applying voltage are controlled by the output signals from the interelectrode abnormality detecting means and the counter as described above. It should be noted that although the discharge down time and the applying voltage will influence the discharge machining gap, the down time and the applying voltage will not too largely affect the roughness of the machined surface of a workpiece or the consumption of the electrode, this is taken into account and in this example other electrical conditions may also be employed so as to control similarly to the above within the scope of the invention.

That is, it is apparent from the foregoing description that the electric discharge peak current value, current waveform, voltage waveform, pulse width and so forth may also be controlled in the same method as described above within the range in which no adverse effects are exerted to the objective machining contents.

In the circuit arrangement shown in FIG. 4, reference numeral (501) designates a multibit coincidence identifying circuit. The outputs from the respective bits from $2^0$ through $2^{13}$ of the counter (14) for detecting the position difference are applied in turn to the multibit coincidence identifying circuit (501). Further, the outputs from the respective bits of a down time setting counter (502) are also applied to the identifying circuit (501), which sequentially identifies the coincidence between the outputs from the counter (14) and the outputs from the down time setting counter (502) and produces a coincidence output when identifying the coincidence therebetween. The coincidence output from the identifying circuit (501) is in turn applied to one input of an AND gate (507). On the other hand, an interelectrode abnormality state detection signal (V$_5$), which is produced from the voltage comparator (26) described with reference to FIGS. 2 and 3, is applied to the other input of the AND gate (507), which sequentially produces a coincidence output which is in turn applied through an OR gate (504) to the reset input R of an R-S flip-flop (505), thereby resetting the flip-flop (505). However, if interelectrode abnormality state detection signal (V$_5$) is not applied, but instead a logic "1" is applied to the V$_5$ input terminal of the machining power source (5), the corresponding interelectrode abnormality state detection signal (V$_5$) can be set by a manual preset rotary switch (506). The respective outputs from the down time setting counter (502) are connected to the respective contact terminals of the switch (506), and the common contact terminal of the switch (506) is in turn applied to one input of an AND gate (503). On the other hand, the signal (V$_5$) is applied to the other input of the AND gate (503), which sequentially produces a corresponding coincidence output which is in turn applied through the OR gate (504) to the reset input R of the flip-flop (505), thereby resetting the flip-flop (505). In this case, the AND gate (507) is closed. Thus, the output from the flip-flop (505) is in turn applied through an amplifier (508) to the input of a final stage switching element (52), thereby driving the switching element (52), which sequentially supplies on-off pulses of voltage (E) between the electrode (1) and the workpiece (3) through the output terminals of the machining power source as shown. The pulse duration time is arbitrarily set as will now be described in greater detail. The coincidence output from the OR gate (504) is further applied to one input of a pulse width setting counter (509), which in turn produces a variety of pulse width outputs which are connected to the respective contact terminals of a switch (510) for selecting the pulse width to a predetermined value. The common contact terminal of the switch (510) is in turn connected to the set input S of the flip-flop (505). When the switch (510) is arbitrarily selected, the selected pulse width output from the switch (510) is in turn applied to the set input of the flip-flop (505) which sequentially produces a selected pulse width output through the amplifier (508) to the switching element (52), thereby arbitrarily setting the pulse width of the pulse produced from the switching element (52). The output $\overline{Q}$ from the flip-flop (505) is also applied to one input of an AND gate (511), and the output from an original oscillator (54) is applied to the other input of the AND gate (511), which sequentially produces an output which is in turn applied to the other input of the pulse width setting counter (509). Further, the output Q from the flip-flop (505) is applied to one input of an AND gate (512), and the output from the original oscillator (54) is also applied to the other input of the AND gate (512). Thus, the output from the oscillator (54) is alternatively selected through the AND gates (511) and (512), the output of which gate (512) is in turn applied to one input of the down time setting counter (502), through the outputs from the output terminals $\overline{Q}$ and Q of the flip-flop (505), thereby setting the down time width and the pulse width of the pulse to be applied between the electrode and the workpiece.

The interelectrode abnormality state detection signal (V$_5$) is also applied to the input of a voltage regulator (513), which is provided to control the decreasing of the applying voltage (E) between the electrode and the workpiece if the interelectrode gap is expanded due to the interelectrode abnormality. As a result the expanded machining gap between the electrode and the workpiece can be returned to a normal value, and it is feasible to electrically discharge even with the adverse effect of machining powder or chips accumulated in the gap.

In the above-described examples, when the interelectrode abnormality state detection signal (V$_5$) becomes logic "0", the down time width is automatically selected to a value corresponding to the difference between the most advanced value of the electrode and the present value of the electrode in such a manner that the larger the difference becomes, the longer the down time width increases with the result that the machining amount is decreased thereby reducing the production of machining chips and thereby normalizing the interelectrode state. On the contrary, when the difference is small, the down time width is set at predetermined value.

Figure 5:
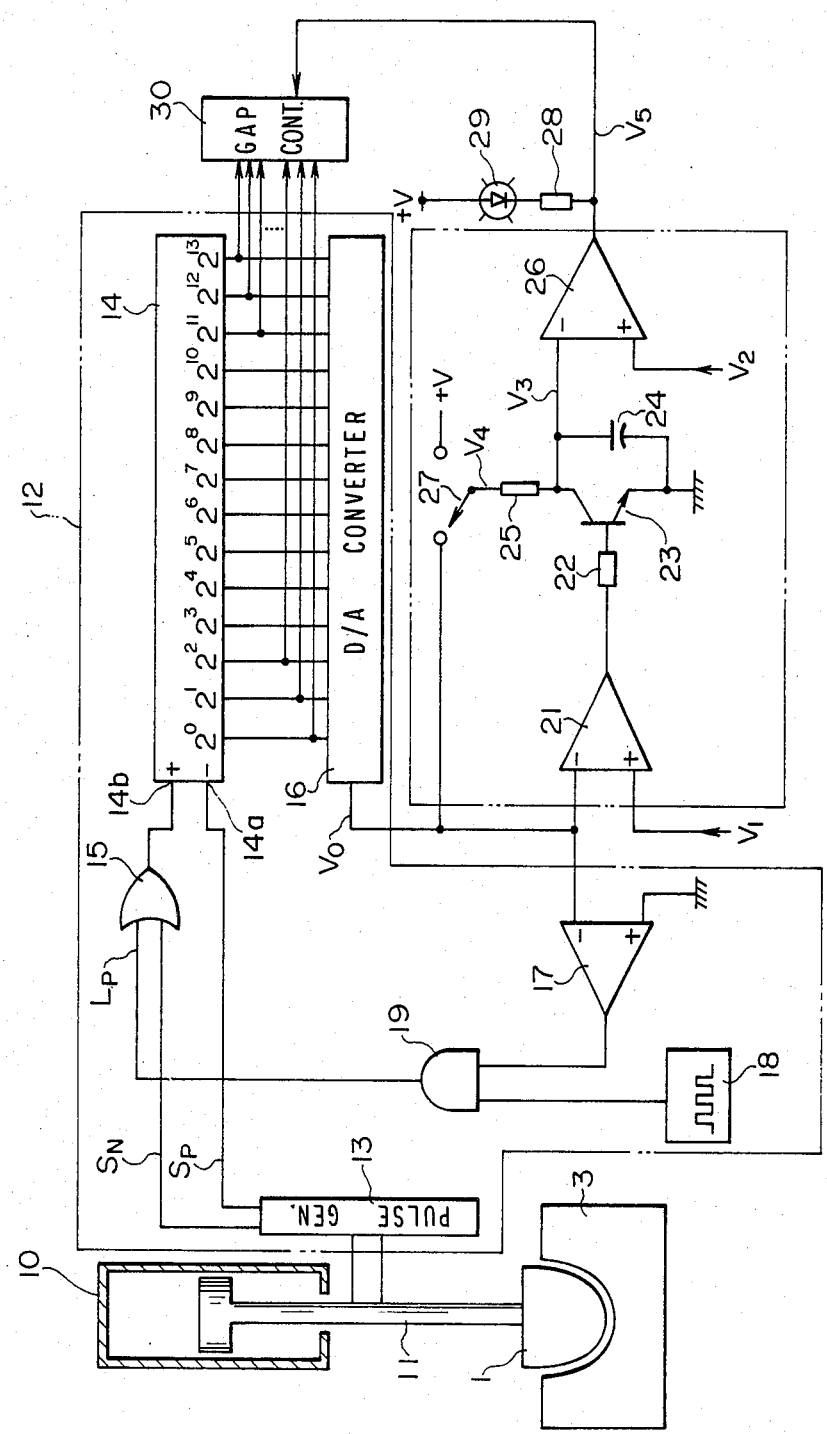
FIG. 5 is a diagram showing a yet further example of the apparatus of the invention having control means in addition to the arrangement shown in FIG. 2.

FIG. 5 shows a further preferred example of an electric discharge machining apparatus of the invention. In this arrangement, the output (V$_5$) from an interelectrode state abnormality identifying means is applied to control means (30) for controlling the interelectrode machining gap. The binary digital values of the outputs $2^0$ through $2^{13}$ from the counter (14) for detecting the difference between the most advanced position of the electrode and the present position of the electrode are also applied to the respective inputs of the control means (30), which thereby produces an output signal for compulsorily expanding the interelectrode machining gap between the electrode and the workpiece, thereby automatically controlling the expanded amount of the machining gap therebetween in response to the interelectrode state.

Figure 6:
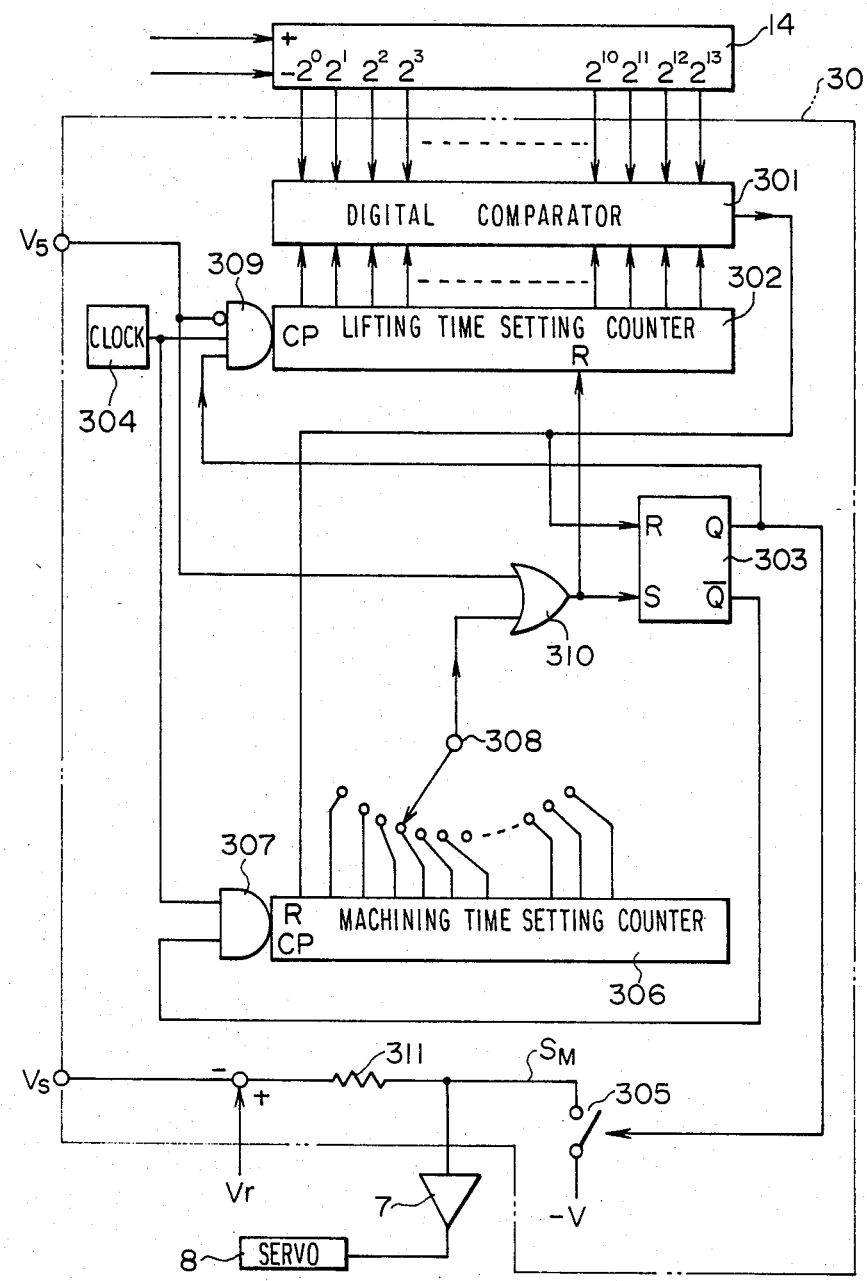
FIG. 6 is a diagram showing the detailed control means shown in FIG. 5.

FIG. 6 shows a yet further preferred example of an electric discharge machining apparatus of the invention in the form of a detailed diagram of the control means (30) for controlling the interelectrode matching gap between the electrode and the workpiece. In this preferred example, the duration time of the signal for compulsorily expanding the machining gap is controlled by the afore-described signals, thereby controlling the ratio of the expanded amount of the machining gap, the machining time and the expanding operation time.

In the circuit shown in FIG. 6, reference numeral (301) designates a multibit coincidence identifying circuit (a digital comparator). The outputs $2^0$ through $2^{13}$ from the counter (14) for detecting the position difference are applied to the multibit coincidence identifying circuit (301), and the outputs from the respective bits of a machining gap compulsorily expanding time setting counter (302) are also applied to the identifying circuit (301), which sequentially identifies the coincidence between the outputs from the counter (14) and the outputs from the setting counter (302) and produces a coincidence output when identifying the coincidence therebetween. The coincidence output from the identifying circuit (301) is in turn applied to the reset input R of an R-S flip-flop (303), thereby resetting the flip-flop (303) when the outputs from the counter (14) coincide with the outputs from the setting counter (302). The machining gap compulsorily expanding time to be set by the counter (302) becomes the product of the period of the clock pulse from a reference clock pulse generator (304) and the value of the output from the counter (14) for detecting the position difference when the coincidence occurs therebetween as described above. Thus, the output Q from the flip-flop (303) is in turn applied to an analog switch (305), which generates an electrode compulsorily lifting signal ($S_M$) between the interelectrode servo circuits (7) and (8) indicated in FIG. 1, thereby operating the switch (305). That is, the output Q from the flip-flop (303) becomes a high level "1" during the time corresponding to the position difference therebetween, during which the electrode is compulsorily moved upwardly. The output $\overline{Q}$ from the flip-flop (303) is applied to one input of a clock pulse input AND gate (307) of a machining time setting counter (306). When the R-S flip-flop (303) is once reset, the output Q of the flip-flop (303) becomes a low level "0" while the inverting output $\overline{Q}$ of the flip-flop (303) becomes, on the contrary, a high level "1", which is in turn applied to the one input of the AND gate (307), thereby opening the AND gate (307). On the other hand, the reference clock pulse from the generator (304) is applied to the other input of the AND gate (307). Thus, when the AND gate (307) is thus opened, the reference clock pulse from the generator (304) is in turn applied through the AND gate (307) to a machining time setting counter (306), thereby setting the counter (306). A variety of machining time setting output signals are connected to the respective contact terminals of a machining time preset switch (308), the common contact terminal of which switch (308) is in turn connected to one input of an OR gate (310). When a predetermined machining time is manually set by the switch (308), the set machining time signal from the switch (308) is in turn applied through the OR gate (310) to the set input S of the flip-flop (303). Thus, the output Q of the flip-flop (303) becomes a low level "0" during the time set by the switch (308) in this manner. The output Q of the flip-flop (303) is applied to the analog switch (305), thereby opening the switch (305), thereby conducting an ordinary servo control between the electrode and the workpiece on the basis of the difference between the interelectrode signal (Vs) and the reference voltage ($V_R$) produced from a voltage comparator to which both the signal (Vs) and the voltage ($V_R$) are applied as shown. A resistor (311) is connected between the signal ($S_M$) output terminal of the analog switch (305) and the comparator for protecting the comparator to which the signal (Vs) and the reference voltage ($V_R$) are applied when the electrode compulsorily lifting signal ($S_M$) is generated from the analog switch (305).

Further, the interelectrode state abnormality detection signal ($V_5$) is applied to the inverting input of an AND gate (309), and the reference clock pulse from the generator (304) is also applied to another input of the AND gate (309) of the machining gap compulsorily expanding time setting counter (302). Thus, when the signal ($V_5$) is a low level "0", that is, the interelectrode is in an abnormal state, the above-described operation is executed as will be described in greater detail. The output Q from the flip-flop (303) is applied to the other input of the AND gate (309). Further, the signal ($V_5$) is also applied to the other input of the OR gate (310). Thus, the signal ($V_5$) is discriminated through the AND gate (309) and the OR gate (310). When the signal ($V_5$) is a high level "1", the OR gate (310) in turn produces an output "1" which is sequentially applied to the set terminal S of the flip-flop (303), thereby setting the flip-flop (303). In this case, the output Q of the flip-flop (303) is a low level "0", thereby opening the analog switch (305) and accordingly producing from the switch (305) no electrode lifting signal ($S_M$). Accordingly, the normal interelectrode servo control is executed in the machining gap between the electrode and the workpiece.

In the above-described examples, the electrode lifting time is controlled in the foregoing description, but the invention is also directed to the control of the machining gap between the electrode and the workpiece so as to improve the interelectrode machining gap state on the basis the machining gap abnormality state detection signal, and the control of the machining gap between the electrode and the workpiece can be suitably carried out by the above-described signals such as machining time, electrode lifting speed, lifting and machining periods, servo reference voltage, servo system gain and so forth in addition to the electrode lifting time without any difficulty in technique by those skilled in the art.

Figure 7:
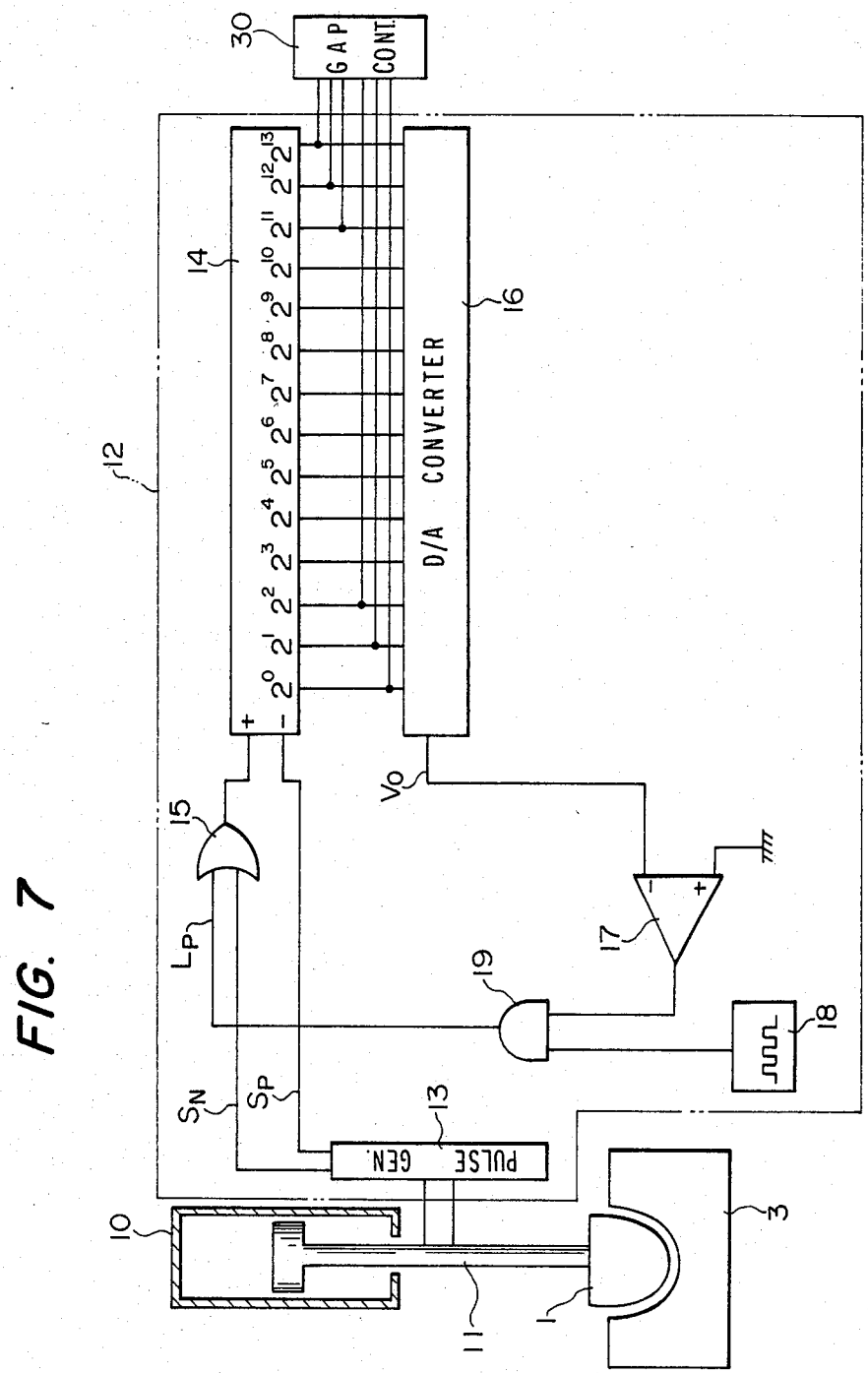
FIG. 7 is a diagram showing a principle of a still further example of the apparatus of the invention.
Figure 8:
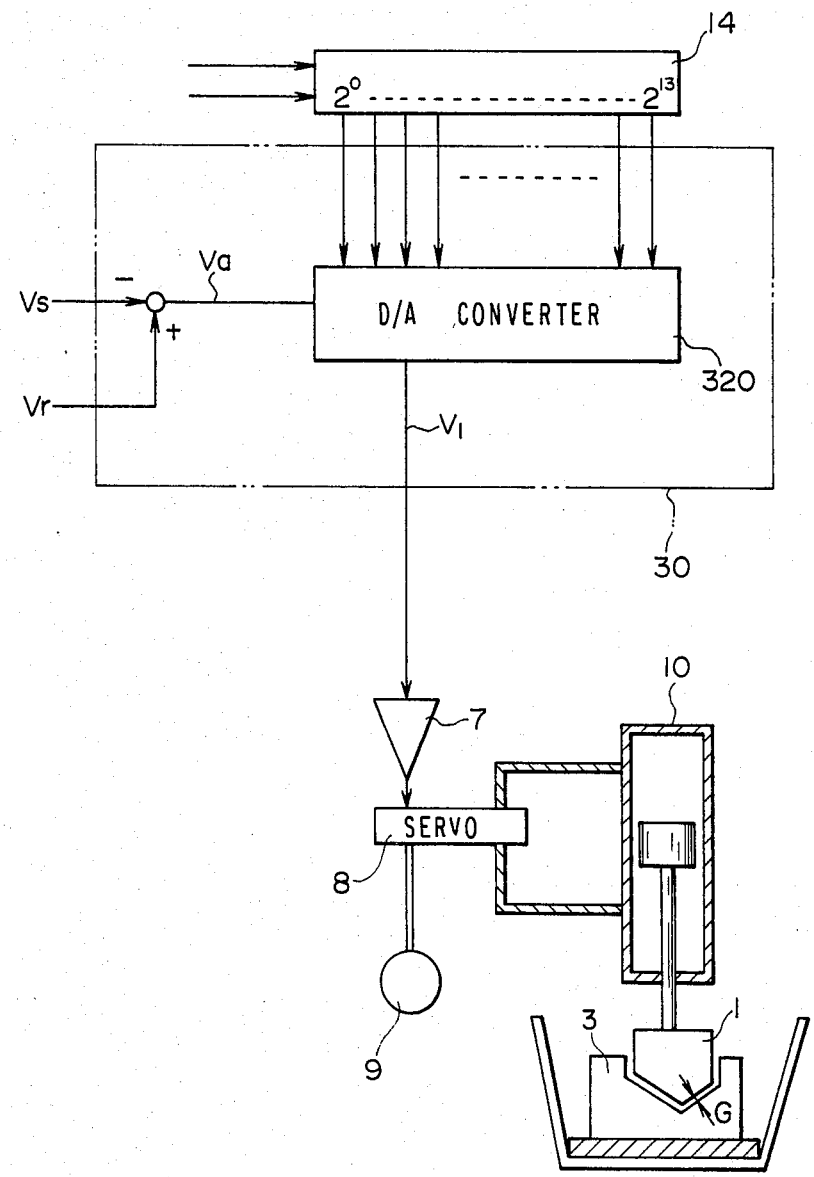
FIG. 8 is a diagram showing the schematic arrangement of the control means shown in FIG. 7.
Figure 9A:
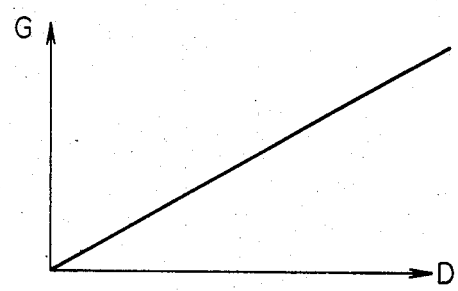
FIG. 9a is a graphical representation indicating the characteristics of the apparatus shown in FIG. 7.
Figure 9B:
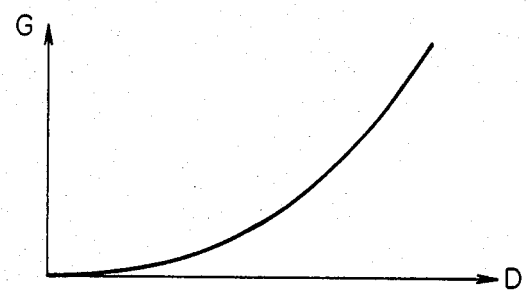
FIG. 9b is a graphical representation indicating the characteristics of the apparatus shown in FIG. 7.
Figure 9C:
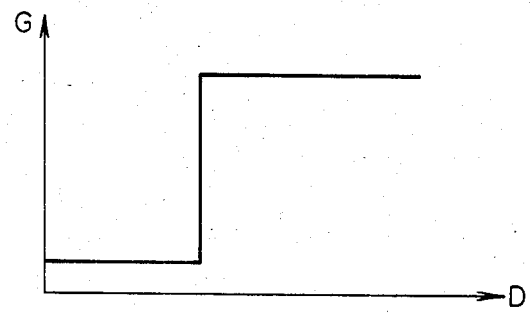
FIG. 9c is a graphical representation indicating the characteristics of the apparatus shown in FIG. 7.

FIGS. 7 to 9 show the fundamental principle of still another preferred example of an electric discharge machining apparatus of the invention, wherein like reference numerals designate the equivalent or corresponding parts and components shown in FIG. 5 and will be omitted from the following description for the convenience of explanation. FIGS. 9a through 9c are graphical representations of the relationship between the amplification degree (gain) G and the difference D between the most advanced position of the electrode and the present position of the electrode of this example of the electric discharge machining apparatus of the invention.

FIGS. 7 through 9 show a circuit arrangement of the electric discharge machining apparatus in which the amplification degree corresponding to the voltage $V_0$ is controlled by a servo system. The outputs $2^0$ through $2^{13}$ from the reversible counter (14) are applied to the respective inputs of a multiplication type digital-to-analog converter (320), which sequentially multiplies the difference voltage Va ($Va = V_R - Vs$) between the interelectrode average voltage Vs and the reference voltage $V_R$ by the position difference between the most advanced position of the electrode and the present position of the electrode, that is, $Va \times$ (most advanced position − present position) = $V_1$, and produces an output $V_1$. The signal Va is obtained through a voltage comparator to which the interelectrode average voltage Vs and the reference voltage $V_R$ are applied for producing the difference voltage Va as shown, and this value Va is in turn applied to the input of the converter (320). The concrete example of the above digital-to-analog converter may be CMOS-IC-AD7520 manufactured by Analog Device Co. (U.S.A.).

According to the invention, the amplification degree (gain) G of the servo system can be varied proportionally to the difference D between the most advanced position of the electrode and the present position of the electrode and accordingly the interelectrode machining gap length. More specifically, in the case of a narrow machining gap which must be finely and precisely controlled, the gain G is set to small value. On the other hand, in the case of a wide machining gap wherein it is necessary to perform a pumping operation to thereby exhaust sludge between the electrodes, the gain is set to a high value, thereby dynamically operating at high speed.

In FIG. 9, the ordinate axis represents an amplification degree and the abscissa axis represents the difference D between the most advanced position of the electrode and the present position of the electrode.

In the case where the electrode is periodically jumped by externally applying a compulsor shorting state signal to an electric discharge machining apparatus, when the electrode once lifted is returned, only the interelectrode voltage has been heretofore detected so as to identify whether the electrode was disposed at the original position or not. Accordingly, the position of the electrode could not be detected until the shorting signal is produced. Thus, an overshoot has always occurred, with the drawback that the electrode is caused to contact the workpiece to be machined. According to the present invention, since the gain varies in response to the distance to the original position of the electrode and the moving speed of the electrode can be automatically decelerated, such an overshoot which occurred in the conventional apparatus can be eliminated. Further, the wider the machining gap between the electrode and the workpiece is, the faster the moving speed of the electrode becomes. Accordingly, the time required to recover the interelectrode state by expanding the machining gap between the electrode and the workpiece is reduced, thereby improving the machining efficiency of the apparatus of the invention.

It should be noted that although the foregoing description is directed to an electric discharge machining apparatus in which the gain G varies rectilinearly proportionally to the difference D between the most advanced position of the electrode and the present position of the electrode, that is, the relationship indicated by a curve in FIG. 9A, the gain G may not always be rectilinear, but may be factorial as shown in FIG. 9B and may also be two or more polygonal linear as shown in FIG. 9C as apparent from the foregoing description so as to obtain the same objects of the invention.

Figure 10:
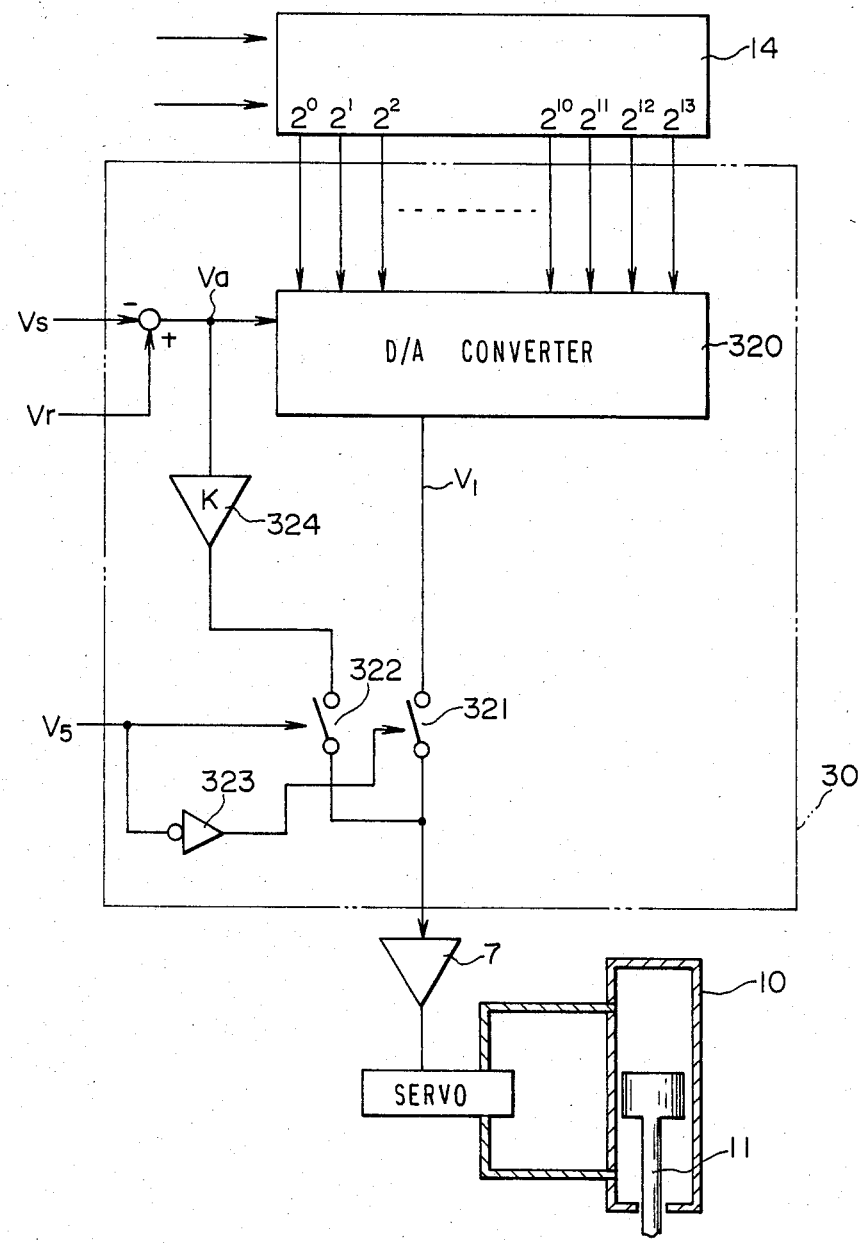
FIG. 10 is a diagram showing the essential arrangement of a particular example of the control means shown in FIG. 7.

FIG. 10 shows a still another preferred example of an electric discharge machining apparatus of the invention on the basis of the fundamental principle indicated in FIGS. 7 through 9 particularly in the form of a detailed circuit arrangement of the control means (30) used therefor.

That is, in FIG. 10, outputs $2^0$ to $2^{13}$ from a reversible counter (14) for detecting the position of the electrode are applied to the corresponding inputs of a multiplication type digital-to-analog converter (320) in the control means (30).

The detail of the control circuit (30) for controlling the amplification degree of a servo system will be described on the basis of the outputs from the counter (14) with reference to FIG. 10. The interelectrode abnormality state detection signal ($V_5$) is applied directly to an analog switch (322) and through an inverter (323) to an analog switch (321). When no abnormality state of the interelectrode machining gap between the electrode and the workpiece occurs and accordingly the detection signal ($V_5$) is a high level "1", the inverted signal "0" through the inverter (323) is applied to the analog switch (321), which is therefore opened, while the detection signal "1" is directly applied to the analog switch (322), which is therefore closed.

Further, an interelectrode average voltage Vs and a reference voltage $V_R$ are applied to a voltage comparator, which sequentially produces as an interelectrode servo signal a difference voltage Va which is in turn applied through an amplifier (324) having a predetermined amplification degree K and the closed analog switch (322) to the input of a servo amplifier (7), thereby machining the workpiece with an ordinary gain.

In an abnormal state occurs between the electrodes and the detection signal ($V_5$) becomes a low level "0", the inverted signal "1" through the inverter (323) is applied to the analog switch (321), which is therefore closed, while the detection signal "0" is directly applied to the analog switch (322), which is therefore opened. The interelectrode servo signal Va from the comparator is also applied to the other input of the multiplication type digital-to-analog converter (320), which sequentially multiplies the servo signal Va thus received by the digital outputs $2^0$ through $2^{13}$ from the counter (14) and thereby produces an analog output $V_1 = Va \times$ (most advance position − present position). The output $V_1$ from the converter (320) is in turn applied through the closed analog switch (321) to the input of the servo amplifier (7), thereby controlling the servo gain proportionally to the difference between the most advanced position or value of the electrode and the present position or value of the electrode. Therefore, the higher the difference is, that is, the greater the abnormal state is, the higher the servo gain becomes and accordingly the faster the feeding speed of the electrode becomes. Accordingly, by controlling the gain of the servo loop in response to the variation in the machining gap between the electrode and the workpiece, the electrode can be quickly moved with respect to the workpiece so as to thereby rapidly remove or exhaust the accumulated sludge, stagnation of sludge, or any chips in the machining gap.

The concrete example of the above multiplication type digital-to-analog converter (320) may be an AD7520 manufactured by Analog Device Co. (U.S.A.)

It should be noted that since the foregoing description is directed to the variation in the servo gain in response to the difference between the most advanced position of the electrode and the present position of the electrode, if the abnormal state of the machining gap between the electrode and the workpiece is more simply detected, the same advantage can also be expected merely by increasing the servo gain. However, in this case, the most advanced value approaches the present value of the electrode so that high gain is maintained even immediately before the short-circuit between the electrode and the workpiece. Accordingly, there is a concern that in this case to the electrode may approach to closely to the workpiece. When the above digital-to-analog converter is employed effectively in the apparatus of the invention, the servo gain can be automatically controlled so that, when the electrode excessively approaches the workpiece, the servo gain is decreased, thereby eliminating the excessive approach of the electrode to the workpiece and also eliminating hunting of the servo system.

Figure 11A:
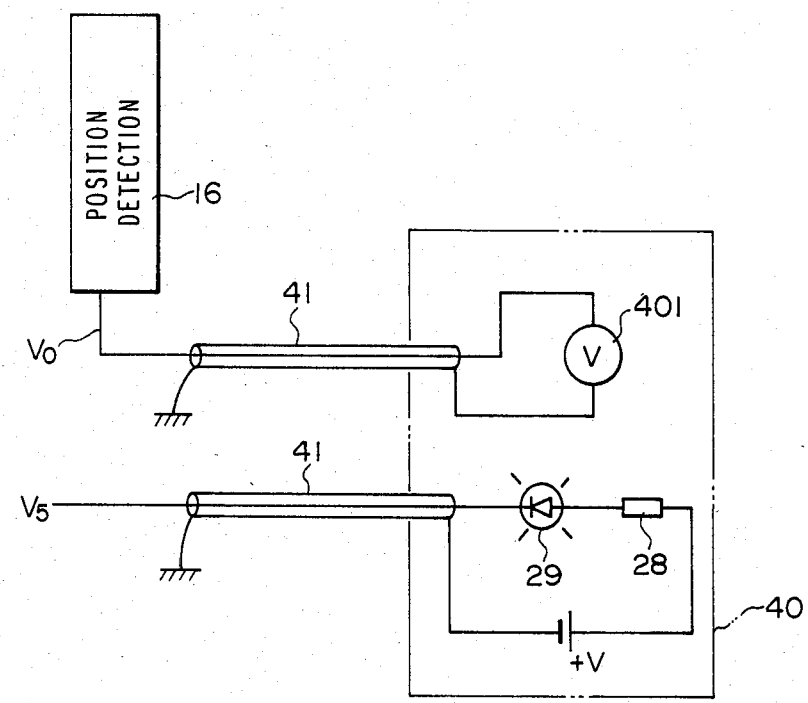
FIG. 11a is a diagram showing the essential arrangement of still another example of the apparatus of the invention containing indicating means provided at a place isolated from the electrodes.
Figure 11B:
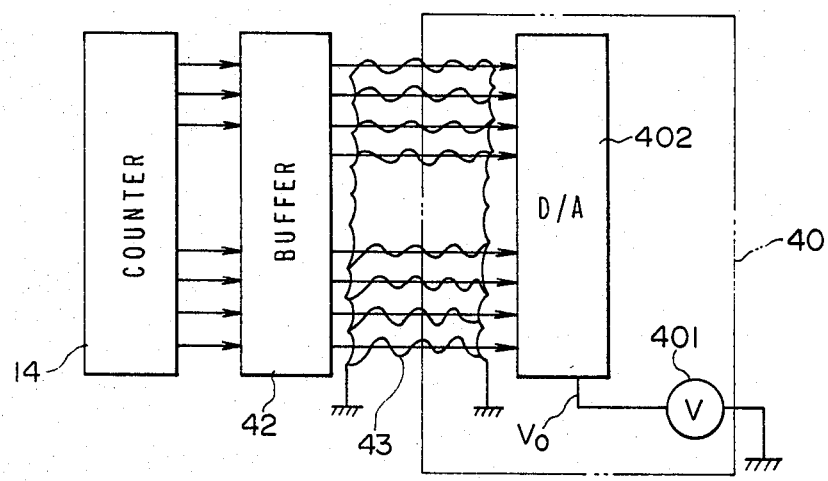
FIG. 11b is a diagram showing the arrangement in which a signal is fed through a twisted pair line group to the indicating means.

FIGS. 11a and 11b show a still another preferred example of an electric discharge machining apparatus of the invention incorporating indicating means for indicating the interelectrode state on the basis of an output signal from electrode position detecting means (20) or on the basis of an output signal from the interelectrode state identifying means (16).

In the circuit arrangement shown in FIG. 11A, the output $V_0$ from the electrode position identifying means (12) is applied through a transmission line (41) for transmitting the output $V_0$ to a receiver circuit (40), and an interelectrode abnormality state detection signal ($V_5$) from interelectrode state identifying means (20) is applied through a transmission line (41) for transmitting the signal ($V_5$) to the receiver circuit (40). Thus, the output $V_0$ of the digital-to-analog converter in the electrode position detecting means (16) can be directly read by a voltmeter (401) connected through the transmission line to the identifying means. Thus, by observing the $V_0$ of the converter the difference between the most advanced position of the electrode (1) relative to the workpiece (3) and the present position of the electrode (11) can be directly investigated on the voltmeter, thereby obtaining the same effect as observing a mechanical type dial gauge.

In FIG. 11a, the receiver circuit (40) and accordingly the indicating means can be provided at a place isolated from the electrode (1).

FIG. 11b shows a still another preferred example of an electric discharge machining apparatus in which the output $V_0$ is not applied as an analog signal but is fed as a digital signal, and the digital output $V_0$ is converted through a digital-to-analog converter to an analog voltage, which is then observed, thereby effectively feeding the signal $V_0$ in an environment producing electric noise.

In this circuit arrangement shown in FIG. 11B, the output from the reversible counter (14) of the electrode position detecting means (12) is applied through a buffer (42), which amplifies the signal $V_0$ thus applied, and twisted pair transmission line group (43) to the receiver circuit (40), and are applied to a digital-to-analog converter (402), which sequentially converts the digital signals thus received into a voltage $V_0$ corresponding to the analog signal $V_0$.

Accordingly, since the propriety of the interelectrode machining gap state of the electric discharge machining apparatus can be accurately detected at a place isolated from the electrode, machining failure can be prevented beforehand in the machining operation of the electric discharge machining apparatus of the invention.

It is evident from the foregoing description that the indicating means shown in FIGS. 11A and 11B may also be applied to the examples of the electric discharge machining apparatuses shown in FIGS. 3 and 4 as well as in FIGS. 5 through 10.

I claim:

1. An electric discharge machining apparatus of the type in which a workpiece is machined by generating an electric discharge across a machining gap between a confronting electrode and said workpiece through an insulating machining solution while feeding said electrode to said workpiece, said apparatus comprising: electrode position detecting means for detecting, during a present electric discharge machining operation, a difference value between the present position of said electrode relative to said workpiece and a most advanced position of said electrode detected during said present electric discharge of machining operation; first means for outputting a signal by identifying the interelectrode state on the basis of said difference value detected by said electrode position detecting means; and means for controlling the operation of said electric discharge machining apparatus in accordance with said signal output from said first means.

2. The apparatus as claimed in claim 1 wherein said first means comprises interelectrode state identifying means for identifying the interelectrode state as abnormal when said difference value is large.

3. The apparatus as claimed in claim 2 wherein said interelectrode state identifying means comprises means for identifying the interelectrode state as abnormal when a detection time, during which said electrode position detecting means detects said large difference value, is longer than a predetermined value.

4. The apparatus as claimed in claim 2 wherein said interelectrode state identifying means comprises means for identifying the interelectrode state as abnormal when the value of the product of said detection time and said difference value becomes higher than a predetermined value.

5. The apparatus as claimed in claim 3 wherein said interelectrode state identifying means comprises means for selectively identifying the interelectrode state as abnormal either when said detection time is longer than a predetermined value or when the value of the product of the detection time and said difference value becomes higher than a predetermined value.

6. The apparatus as claimed in claim 2 wherein said electrode position detecting means comprises a scale for generating a digital signal in response to the advancing or retarding amount of said electrode and a reversible counter for counting the digital signals of said scale.

7. The apparatus as claimed in claim 2 wherein said electrode position detecting means comprises: a scale for generating a digital signal in response to the advancing or retarding amount of said electrode and a reversible counter for counting the digital signals of said scale, a digital-to-analog converter connected to an output side of said reversible counter for converting the value in said reversible counter into an analog amount, a comparator for comparing the output from said converter with a set value and producing an output signal in response to the compared result, a pulse oscillator for generating pulses at a predetermined interval, a first gate circuit to which the output from said comparator and the output from said pulse oscillator are inputted, and a second gate circuit to which the output from said first gate circuit and the digital signal from said scale are inputted for producing an output signal to said reversible counter.

8. The apparatus as claimed in claim 2 wherein said interelectrode state identifying means comprises a comparator for receiving said difference value and for comparing said difference value with a set value and producing an output signal responsive to the compared result.

9. The apparatus as claimed in claim 3 wherein said interelectrode state identifying means comprises: a comparator for receiving said difference value and for comparing said difference value with a set value and producing an output signal responsive to the compared result, and a primary delay circuit provided at the output side of said comparator.

10. The apparatus as claimed in claim 3 wherein said interelectrode state identifying means comprises: a first comparator for receiving said difference value and for comparing said difference value with a set value and producing an output signal responsive to the compared result, a switching element conducting in accordance with the output signal from said comparator, and having a main electrode, a primary delay circuit connected to the main electrode of said switching element and a second comparator for comparing the output from said primary delay circuit with a predetermined value and producing an output signal responsive to the compared result.

11. The apparatus as claimed in claim 4 wherein said interelectrode state identifying means comprises a comparator for receiving said difference value and for comparing said difference value with a set value and producing an output signal responsive to the compared result.

12. The apparatus as claimed in claim 4 wherein said interelectrode state identifying means comprises: a comparator for receiving said difference value and for comparing said difference value with a set value and producing an output signal responsive to the compared result, and a primary delay circuit provided at the output side of said comparator.

13. The apparatus as claimed in claim 4 wherein said interelectrode state identifying means comprises: a first comparator for receiving said difference value and for comparing said difference value with a set value and producing an output signal responsive to the compared result, a switching element conducting in accordance with the output signal from said comparator and having a main electrode, a primary delay circuit connected to the main electrode of said switching element, and a second comparator for comparing the output from said primary delay circuit with a predetermined value and producing an output signal responsive to the compared result.

14. The apparatus as claimed in claim 5 wherein said interelectrode state identifying means comprises: a first comparator for receiving said difference value and for comparing said difference value with a set value and producing an output signal responsive to the compared result, a switching element conducting in accordance with the output signal from said comparator and having a main electrode, a primary delay circuit connected to the main electrode of said switching element, switching means for selectively leading either said difference value or a predetermined constant potential to the main electrode of said switching element, and a second comparator for comparing the output from said primary delay circuit with a predetermined value and producing an output responsive to the compared result.

15. The apparatus as claimed in claim 10 further comprising means for coupling said difference value to said main electrode of said switching element.

16. The apparatus as claimed in claim 13 further comprising means for coupling a predetermined constant potential to said main electrode of said switching element.

17. An electric discharge machining apparatus of the type in which a workpiece is machined by generating an electric discharge across a machining gap between a confronting electrode and said workpiece through an insulating machining solution while feeding said electrode to said workpiece said apparatus comprising: electrode position detecting means for detecting, during a present electric discharge machining operation, a difference value between the present position of said electrode relative to said workpiece and a most advanced position of said electrode detected during said present electric discharge machining operation; first means for outputting a state detection signal by identifying the interelectrode state on the basis of said difference value detected by said electrode position detecting means, and power source means for varying electric machining conditions in response to said state detection signal from said interelectrode state identifying means.

18. The apparatus as claimed in claim 17 wherein said power source means comprises means for varying the electric machining conditions to recover a desired interelectrode state in response to the signal from said first means.

19. The apparatus as claimed in claim 17 wherein said first means comprises interelectrode state idenitfying means for identifying the interelectrode state as abnormal when said difference value is large.

20. The apparatus as claimed in any one of claims 17 through 19 wherein said power source means comprises means for varying at least one of a discharge down time and an applying voltage between the electrodes.

21. The apparatus as claimed in claim 19 wherein said interelectrode state identifying means comprises means for identifying the interelectrode state as abnormal when a detection time, during which said difference value is large, is longer than a predetermined value.

22. The apparatus as claimed in claim 19 wherein said interelectrode state identifying means comprises means for identifying the interelectrode state as abnormal when a detection time, during which said difference value is large, is longer than a predetermined value.

23. The apparatus as claimed in claim 21 wherein said interelectrode state identifying means comprises means for selectively identifying the interelectrode state as abnormal either when said detection time is longer than a predetermined value or when the value of the product of the detection time and said difference value becomes higher than a predetermined value.

24. The apparatus as claimed in claim 19 wherein said electrode position detecting means comprises a scale for generating a digital signal in response to the advancing or retarding amount of said electrode and a reversible counter for counting the digital signals of said scale.

25. The apparatus as claimed in claim 19 wherein said electrode position detecting means comprises: a scale for generating a digital signal in response to the advancing or retarding amount of said electrode and a reversible counter for counting the digital signals of said scale, a digital-to-analog converter connected to an output side of said reversible counter for converting the value in said reversible counter into an analog amount, a comparator for comparing the output from said converter with a set value and producing an output signal in response to the compared result, a pulse oscillator for generating pulses at a predetermined interval, a first gate circuit to which the output from said comparator and the output from said pulse oscillator are inputted, and a second gate circuit to which the output from said first gate circuit and the digital signal from said scale are inputted for producing an output signal to said reversible counter.

26. The apparatus as claimed in claim 19 wherein said interelectrode state identifying means comprises a comparator for receiving said difference value and for comparing the said difference value with a set value and producing an output signal responsive to the compared result.

27. The apparatus as claimed in claim 21 wherein said interelectrode state identifying means comprises: a comparator for receiving said difference value and for comparing said difference value with a set value and producing an output signal responsive to the compared result, and a primary delay circuit provided at the output side of said comparator.

28. The apparatus as claimed in claim 21 wherein said interelectrode state identifying means comprises: a first comparator for receiving said difference value and for comparing said difference value with a set value and producing an output signal responsive to the compared result, a switching element conducting in accordance with the output signal from said comparator and having a main electrode for providing an output, a primary delay circuit connected to the main electrode of said switching element and a second comparator for comparing the output from said primary delay circuit with a predetermined value and producing an output signal responsive to the compared result.

29. The apparatus as claimed in claim 22 wherein said interelectrode state identifying means comprises a comparator for receiving said difference value and for comparing said difference value with a set value and producing an output signal responsive to the compared result.

30. The apparatus as claimed in claim 22 wherein said interelectrode state identifying means comprises: a comparator for receiving said difference value and for comparing said difference value with a set value and producing an output signal responsive to the compared result, and a primary delay circuit provided at the output side of said comparator.

31. The apparatus as claimed in claim 22 wherein said interelectrode state identifying means comprises: a first comparator for receiving said difference value and for comparing said difference value with a set value and producing an output signal responsive to the compared result, a switching element controlled to be conducted in accordance with the output signal from said comparator and having a main electrode, a primary delay circuit connected to the main electrode of said switching element, and a second comparator for comparing the output from said primary delay circuit with a predetermined value and producing an output signal responsive to the compared result.

32. The apparatus as claimed in claim 23 wherein said interelectrode state identifying means comprises: a first comparator for receiving said difference value and for comparing said difference value with a set value and producing an output signal responsive to the compared result, a switching element controlled to be conducted in accordance with the output signal from said comparator and having a main electrode, a primary delay circuit connected to the main electrode of said switching element, switching means for selectively leading either said difference value or a predetermined constant potential to the main electrode of said switching element, and a second comparator for comparing the output from said primary delay circuit with a predetermined value and producing an output responsive to the compared result.

33. The apparatus as claimed in claim 24 wherein said power source means for varying the electric machining conditions comprises: a down time setting counter for setting an electric discharge down time, a coincidence signal when the counted value of said down time setting counter and the counted value of said reversible counter of said electrode position detecting means become coincident, a gate circuit to which the coincidence signal from said coincidence identifying circuit and the interelectrode state identifying means are inputted, a pulse width setting counter for setting the pulse duration time of an on-off pulse of an applying voltage between said electrodes, a flip-flop circuit to which a signal responsive to the set value of said pulse width setting counter as a set signal and the output from said gate circuit as a reset signal are inputted, said flip-flop having a first output terminal for producing a first output to said down time setting counter and a second output terminal for producing an inverting second output, a switching element conducting in accordance with the second output from said flip-flop circuit and having a main electrode, and a power source connected to the main electrode of said switching element.

34. The apparatus as claimed in claim 28 further comprising means for coupling said difference value to said main electrode of said switching element.

35. The apparatus as claimed in claim 31 further comprising means for coupling a predetermined constant potential to said main electrode of said switching element.

36. The apparatus as claimed in claim 33 wherein said power source means for varying the electric machining conditions comprises a regulator for regulating the output value of said power source connected to the main electrode of said switching element in response to the interelectrode state identifying signal.

37. The apparatus as claimed in claim 36 wherein said regulator comprises means for lowering the applying voltage between said electrode and said workpiece when the machining gap is expanded.

38. An electric discharge machining apparatus of the type in which a workpiece is machined by generating an electric discharge across a machining gap between a confronting electrode and said workpiece through an insulating machining solution while feeding said electrode to said workpiece in response to an electrode feed signal provided to electrode feed means, said apparatus comprising: electrode position detecting means for detecting, during a present electric discharge machining operation, a difference value between the present position of said electrode relative to said workpiece and a most advanced position of said electrode detected during said present electric discharge machining operation; first means for outputting a signal by identifying the interelectrode state on the basis of said difference value detected by said electrode position detecting means, and control means for controlling said electrode feed signal to vary the interelectrode state in response to the output signal from said first means.

39. The apparatus as claimed in claim 38 wherein said control means comprises means for controlling said electrode feed signal to recover a desired interelectrode state in response to the output signal from said first means.

40. The apparatus as claimed in claim 38 wherein said control means comprises amplification degree control means for controlling the amplification degree between an interelectrode servo input digital signal based on the difference between a reference voltage and the interelectrode voltage and the electrode feed applied to said electrode feeding means.

41. The apparatus as claimed in any one of claims 38 through 40 wherein said first means comprises interelectrode state identifying means for identifying the interelectrode state as abnormal when said difference value is large.

42. The apparatus as claimed in claim 41 wherein said interelectrode state identifying means comprises means for identifying the interelectrode state as abnormal when a detection time, during which said electrode position detecting means detects said large difference value, is longer than a predetermined value.

43. The apparatus as claimed in claim 41 wherein said interelectrode state identifying means comprises means for identifying the interelectrode state as abnormal when the value of the product of said electrode position detecting means detects said large difference value, becomes higher than a predetermined value.

44. The apparatus as claimed in claim 42 wherein said interelectrode state identifying means comprises means for selectively identifying the interelectrode state as abnormal either when said detection time is longer than a predetermined value or when the value of the product of said detection time and said difference value becomes higher than a predetermined value.

45. The apparatus as claimed in claim 41 wherein said electrode position detecting means comprises a scale for generating a digital signal in response to the advancing or retarding amount of said electrode and a reversible counter for counting the digital signals of said scale.

46. The apparatus as claimed in claim 41 wherein said electrode position detecting means comprises: a scale for generating a digital signal in response to the advancing or retarding amount of said electrode and a reversible counter for counting the digital signals of said scale, a digital-to-analog converter connected to an output side of said reversible counter for converting the value in said reversible counter into an analog amount, a comparator for comparing the output from said converter with a set value and producing an output signal in response to the compared result, a pulse oscillator for generating pulses at a predetermined interval, a first gate circuit to which the output from said comparator and the output from said pulse oscillator are inputted, and a second gate circuit to which the output from said first gate circuit and the digital signal are inputted for producing an output signal to said reversible counter.

47. The apparatus as claimed in claim 41 wherein said interelectrode state identifying means comprises a comparator for receiving said difference value and for comparing said difference value with a set value and producing an output signal responsive to the compared result.

48. The apparatus as claimed in claim 42 wherein said interelectrode state identifying means comprises: a comparator for receiving said difference value and for comparing said difference value with a set value and producing an output signal responsive to the compared result, and a primary delay circuit provided at the output side of said comparator.

49. The apparatus as claimed in claim 42 wherein said interelectrode state identifying means comprises: a first comparator for receiving said difference value and for comparing said difference value with a set value and producing an output signal responsive to the compared result, a switching element conducting in accordance with the output signal from said comparator and a main electrode, a primary delay circuit connected to the main electrode of said switching element and a second comparator for comparing the output from said primary delay circuit with a predetermined value and producing an output signal responsive to the compared result.

50. The apparatus as claimed in claim 43 wherein interelectrode state identifying means comprises a comparator for receiving said difference signal and for comparing said difference signal with a set value and producing an output signal responsive to the compared result.

51. The apparatus as claimed in claim 43 wherein said interelectrode state identifying means comprises: a comparator for receiving said difference signal and for comparing said difference signal with a set value and producing an output signal responsive to the compared result, and a primary delay circuit provided at the output side of said comparator.

52. The apparatus as claimed in claim 43 wherein said interelectrode state identifying means comprises: a first comparator for receiving said difference value and for comparing said difference value with a set value and producing an output signal responsive to the compared result, a switching element conducting in accordance with the output signal from said comparator and having a main electrode, a primary delay circuit connected to the main electrode of said switching element, and a second comparator for comparin the output from said primary delay circuit with a predetermined value and producing an output signal responsive to the compared result.

53. The apparatus as claimed in claim 44 wherein said interelectrode state identifying means comprises: a first comparator for receiving said difference value and for comparing said difference value with a set value and producing an output signal responsive to the compared result, a switching element controlled to be conducted in accordance with the output signal from said comparator and having a main electrode, a primary delay circuit connected to the main electrode of said switching element, switching means for selectively leading either said difference value or a predetermined constant potential to the main electrode of said switching element, and a second comparator for comparing the output from said primary delay circuit with a predetermined value and producing an output responsive to the compared result.

54. The apparatus as claimed in claim 45 wherein said control means comprises: a machining gap compulsorily expanding time setting counter for setting the time for compulsorily expanding the interelectrode machining gap, a coincidence circuit responsive to the counted value from said machining gap compulsorily expanding time setting counter and to the counted value from said reversible counter of said electrode position detecting means for producing a coincidence signal when both the counted values from said counters become coincident, a machining time setting counter for setting the machining time and reset by the coincidence signal from said coincidence circuit, a logic circuit responsive to the interelectrode abnormality state detection signal representing that the interelectrode state is abnormal and to said coincidence signal for applying a first output signal to said machining time setting counter and a second output signal to said machining gap compulsorily expanding time setting counter, and electrode lifting signal supply means for generating a signal for lifting the feeding electrode preferentially to an ordinary electrode feed control signal to an electrode feeding unit upon receipt of the second output from said logic circuit.

55. The apparatus as claimed in claim 45 wherein said amplification degree control means for controlling the amplification of said control means comprises a digital-to-analog converter responsive to the digital output signal from said reversible counter of said electrode position detecting means and the interelectrode servo input digital signal for producing an analog signal on the basis of said digital input signals.

56. The apparatus as claimed in claim 49 further comprising means for coupling said difference value to said main electrode of said switching element.

57. The apparatus as claimed in claim 52 further comprising means for coupling a predetermined constant potential to said main electrode of said switching element.

58. The apparatus as claimed in claim 55 wherein said logic circuit comprises a flip-flop circuit including a set terminal to which a signal corresponding to the set value of the machining time in the interelectrode abnormality state detection signal is inputted, a reset terminal to which the coincidence signal from said coincidence circuit is inputted, a first output terminal for producing a first output signal to said electrode lifting signal supply means and said coincidence circuit, and a second output terminal for producing a second output signal corresponding to an inverted first output signal to said machining time setting counter.

59. The apparatus as claimed in claim 55 wherein said digital-to-analog converter is a multiplication type digital-to-analog converter.

60. The apparatus as claimed in claim 55 wherein said amplification control means for controlling the amplification degree of said control means comprises: a digital-to-analog converter responsive to an interelectrode servo input digital signal for converting said input digital signal into the analog amount of the digital output signal from said reversible counter of said electrode position detecting means, an amplifier to which said interelectrode servo input digital signal is inputted, and switching means responsive to the output signal from said interelectrode state identifying means for selectively producing the output signal from said converter or the output signal from said amplifier.

61. The apparatus as claimed in claim 58 wherein said electrode lifting signal supply means comprises: a switch operating in accordance with the first output from said logic circuit, and a power source connected to said switch.

62. An electric discharge machining apparatus of the type wherein a workpiece is machined by generating an electric discharge across a machining gap between a confronting electrode and said workpiece through an insulating machining solution while feeding said electrode to said workpiece, said apparatus comprising: electrode position detecting means for detecting, during a present electric discharge machining operation, a difference value between the present position of said electrode relative to said workpiece and a most advanced position of said electrode detected during said present electric discharge of machining operation; first means for outputting a signal by identifying the interelectrode state on the basis of said difference value detected by said electrode position detecting means, and indicating means for indicating the interelectrode state in accordance with either said difference value or the output signal from said first means.

63. The apparatus as claimed in claim 62 wherein said indicating means is provided at a place isolated from said electrode through a transmission line with said difference value or the output from said first means being provided to said indicating means via said transmission line.

64. The apparatus as claimed in claim 63 wherein said indicating means comprises means for optically indicating the interelectrode state.

65. The apparatus as claimed in claim 63 wherein said indicating means is an instrument for indicating the value of the output signal from said electrode position detecting means.

66. The apparatus as claimed in claim 63 wherein said first means comprises interelectrode state identifying means for identifying the interelectrode state as abnormal when said difference value is large.

67. The apparatus as claimed in claim 66 wherein said first means comprises interelectrode state identifying means for identifying the interelectrode state as abnormal when a detection time, during which said electrode position detecting means detects said large difference value, is longer than a predetermined value.

68. The apparatus as claimed in claim 66 wherein said interelectrode state identifying means comprises means for identifying the interelectrode state as abnormal when the value of the product of said detection time and said difference value becomes higher than a predetermined value.

69. The apparatus as claimed in claim 66 wherein said interelectrode state identifying means comprises means for selectively identifying the interelectrode state is abnormal either when said detection time is longer than a predetermined value or when the value of the product of said detection time and said difference value becomes higher than a predetermined value.

70. The apparatus as claimed in claim 66 wherein said electrode position detecting means comprises a scale for generating a digital signal in response to the advancing or retarding amount of said electrode and a reversible counter for counting the digital signals of said scale.

71. The apparatus as claimed in claim 66 wherein said electrode position detecting means comprises: a scale for generating a digital signal in response to the advancing or retarding amount of said electrode and a reversible counter for counting the digital signals of said scale, a digital-to-analog converter connected to an output side of said reversible counter for converting the value in said reversible counter into an analog amount, a comparator for comparing the output signal in response to the compared result, a pulse oscillator for generating pulses at a predetermined interval, a first gate circuit to which the output from said comparator and the output from said pulse oscillator are inputted, and a second gate circuit to which the output from said first gate circuit and the digital signal from said scale are inputted for producing an output signal to said reversible counter.

72. The apparatus as claimed in claim 66 wherein said interelectrode state identifying means comprises a comparator for receiving said difference value and said difference value with a set value and producing an output signal responsive to the compared result.

73. The apparatus as claimed in claim 67 wherein said interelectrode state identifying means comprises: a comparator for receiving said difference value and for comparing said difference value with a set value and producing an output signal responsive to the compared result, and a primary delay circuit provided at the output side of said comparator.

74. The apparatus as claimed in claim 67 wherein said interelectrode state identifying means comprises: a first comparator for receiving said difference value and for comparing said difference value with a set value and producing an output signal responsive to the compared result, a switching element conducting in accordance with the output signal from said comparator and having a main electrode, a primary delay circuit connected to the main electrode of said switching element and a second comparator for comparing the output from said primary delay circuit with a predetermined value and producing an output signal responsive to the compared result.

75. The apparatus as claimed in claim 68 wherein said interelectrode state identifying means comprises a comparator for receiving said difference signal and for comparing said difference value with a set value and producing an output signal responsive to the compared result.

76. The apparatus as claimed in claim 68 wherein said interelectrode state identifying means comprises: a comparator for receiving said difference value and for comparing said difference value with a set value and producing an output signal responsive to the compared result, and a primary delay circuit provided at the output side of said comparator.

77. The apparatus as claimed in claim 68 wherein said interelectrode state identifying means comprises: a first comparator for receiving said difference value and for comparing said difference value with a set value and producing an output signal responsive to the compared result, a switching element controlled to be conducted in accordance with the output signal from said comparator and having a main electrode, a primary delay circuit connected to the main electrode of said switching element, and a second comparator for comparing the output from said primary delay circuit with a predetermined value and producing an output signal responsive to the compared result.

78. The apparatus as claimed in claim 69 wherein said interelectrode state identifying means comprises: a first comparator for receiving said difference signal and for comparing said difference value with a set value and producing an output signal responsive to the compared result, a switching element conducting in accordance with the output signal from said comparator and having a main electrode, a primary delay circuit connected to the main electrode of said switching element, switching means for selectively leading either said difference value or a predetermined constant potential to the main electrode of said switching element, and a second comparator for comparing the output from said primary delay circuit with a predetermined value and producing an output response to the compared result.

79. The apparatus as claimed in claim 70 wherein said indicating means comprises a digital-to-analog converter for converting the digital output signal of said reversible counter of said electrode position detecting means transmitted through a transmission line made of twisted pair transmission line group into an analog amount.

80. The apparatus as claimed in claim 74 further comprising means for coupling said difference value to the main electrode of said switching element.

81. The apparatus as claimed in claim 77 further comprising means for coupling a predetermined constant potential to said main electrode of said switching element.

* * * * *